United States Patent [19]

Rottinghaus

[11] 4,275,791
[45] Jun. 30, 1981

[54] YIELDABLE DISC BLADE ASSEMBLY

[76] Inventor: Robert B. Rottinghaus, 4121 S. Canfield Rd., Jesup, Iowa 50648

[21] Appl. No.: 61,192

[22] Filed: Jul. 27, 1979

[51] Int. Cl.³ .................... A01B 61/00; A01B 71/04
[52] U.S. Cl. .................................... 172/570; 172/599
[58] Field of Search ............. 172/570, 602, 599, 601, 172/544

[56] References Cited

U.S. PATENT DOCUMENTS

| 2,253,391 | 8/1941 | Ohlendorf | 172/599 |
| 2,324,064 | 7/1943 | Coffing | 172/570 |
| 3,324,065 | 7/1943 | Coffing | 172/570 |
| 3,576,216 | 4/1971 | Tanke | 172/570 |

FOREIGN PATENT DOCUMENTS

| 776767 | 6/1957 | United Kingdom | 172/21 |
| 969345 | 9/1964 | United Kingdom | 172/601 |

Primary Examiner—Richard J. Johnson
Attorney, Agent, or Firm—Henderson & Sturm

[57] ABSTRACT

A yieldable disc blade assembly for individual disc blades which prevents structural damage of the disc blades when such blades contact a rock or other obstruction in the field. Once the disc blade is tripped by the force of the blade encountering an obstruction, the assembly requires a decreased force to move the disc blade from the normal working position to the yielding position away from the obstruction.

6 Claims, 5 Drawing Figures

U.S. Patent　　　Jun. 30, 1981　　　4,275,791
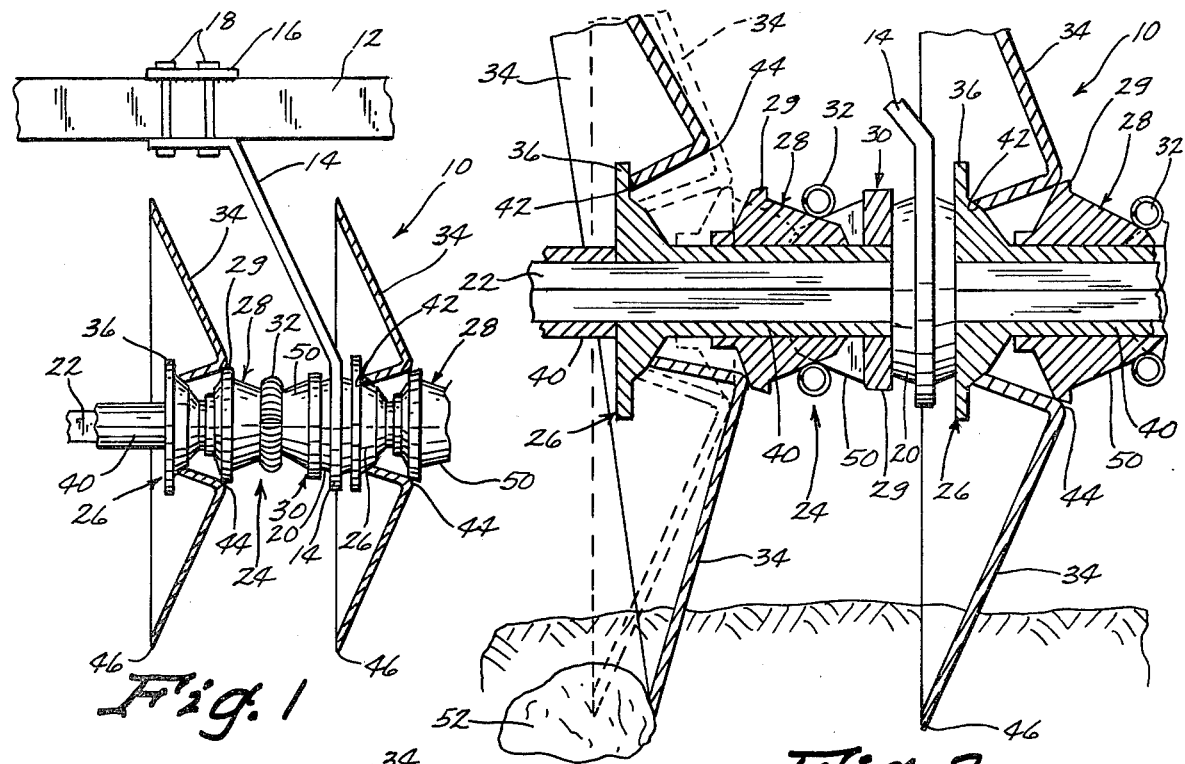
Fig. 1
Fig. 2
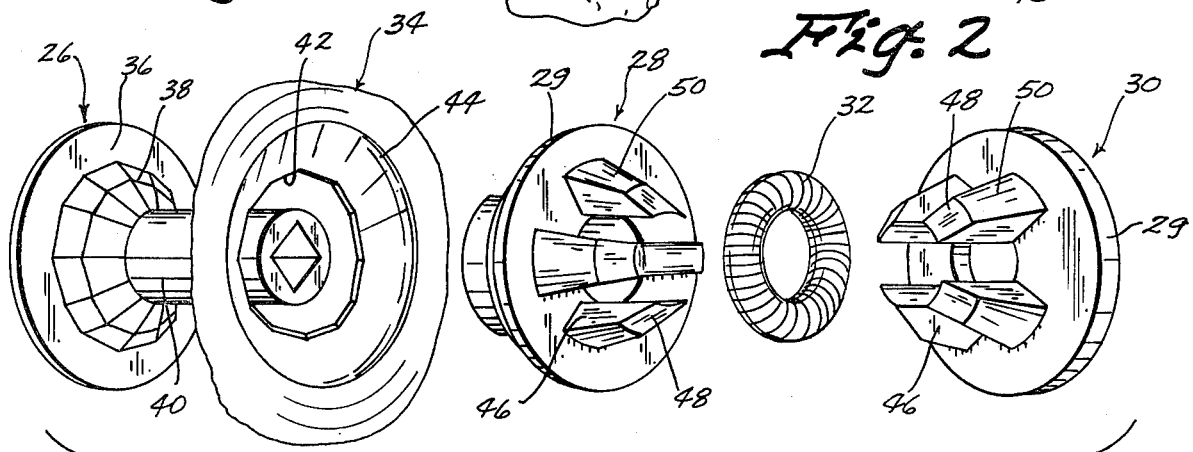
Fig. 3
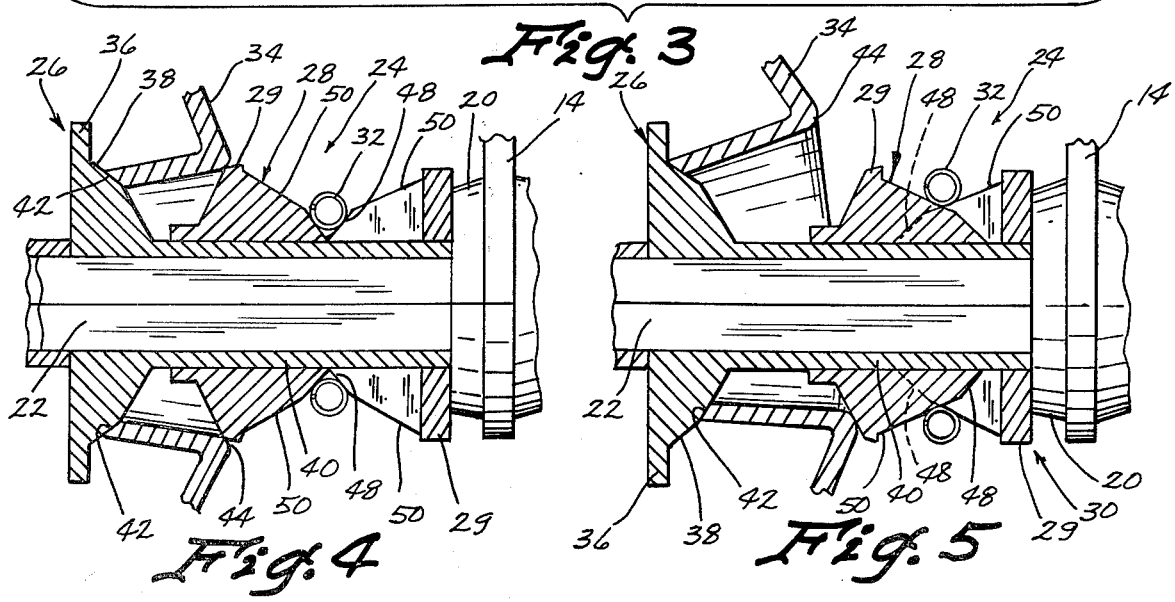
Fig. 4
Fig. 5

YIELDABLE DISC BLADE ASSEMBLY

BACKGROUND OF THE INVENTION

The present invention relates generally to yieldable ground working implements and more particularly to an assembly which permits the individual disc blades of a disc harrow implement to yield when such blades encounter an obstruction in the field.

Yieldable mountings for disc harrows presently available include structures with heavy flat spring support standards interconnecting the implement frame and the disc gang. Typically, three standards support a disc gang of nine disc blades; and the standards must have enough holding force to keep all nine disc blades in their ground engaging working positions. If the center disc blade encounters a rock, the blade must overcome the holding force of all three standards before yielding. Thus, an individual disc blade is subjected to the force required to hold nine disc blades in their working position. Further, as the disc blade moves away from its normal working position the force required is progressively increased.

Other structures providing for the yielding of individual disc blades also require progressively increasing force as the disc blade moves away from the obstruction. The increasing force required magnifies the damage to the disc blades's sharp edge and the entire disc blade structure.

Those concerned with the lost time and expense involved in the repair and replacement of disc blades recognize the need for an improved yieldable disc blade assembly.

SUMMARY OF THE INVENTION

The instant invention includes a yieldable biasing means which holds the individual disc blade in a normal working position. When the disc blade hits a rock or other object in the field, the force is transmitted to the biasing means which yields and therefore allows the individual disc blade to yield, thereby preventing structural damage to the disc blade. The yieldable biasing means, once tripped by the increased force transmitted by the rock, allows the disc blade to move further away from the working position with application of a force less than the force required to initially trip the disc blade.

An object of the present invention is the provision of an improved yieldable disc blade assembly.

Another object is to provide a disc blade assembly which will prevent, or at least minimize damage to disc blades.

A further object of the invention is the provision of a disc blade assembly wherein the force required to initially trip the disc blade is greater than the force required to continue to move the disc blade away from the working position.

Still another object is to provide a disc blade assembly which is safe and easy to assemble and repair.

A still further object is to provide a disc blade assembly which is easy to manufacture.

Other objects, advantages, and novel features of the present invention will become apparent from the following detailed description of the invention when considered in conjunction with the accompanying drawings.

BRIEF DESCRIPTION OF THE DRAWINGS

Referring to the drawings:

FIG. 1 is a front elevational view of a portion of a disc gang mounted on an implement frame;

FIG. 2 is an enlarged sectional view showing adjacent disc blades, one being in the yielding position with the normal working position shown in dashed lines;

FIG. 3 is an exploded perspective view showing the components of the yieldable structure with the outer portions of the disc blade broken away;

FIG. 4 is an enlarged sectional view of the yieldable structure in the normal working position; and FIG. 5 is an enlarged section view similar to FIG. 4 showing the yieldable structure in the yielding position.

DESCRIPTION OF THE PREFERRED EMBODIMENTS

Referring now to the drawings, wherein like reference numerals designate identical or corresponding parts throughout the several views, FIG. 1 shows a portion of a disc gang 10 attached to an implement frame 12 by one of a plurality of bearing standards 14. The bearing standard 14 is attached at its upper end to frame 12 by plate 16 and bolts 18. A bearing 20 is journaled in the lower end of standard 14 and bearing 20 is adapted to rotatably receive a square shaft or arbor bolt 22.

The arbor bolt 22 carries a plurality of yieldable disc blade assemblies 24 as best shown in FIG. 2. Each disc blade assembly 24 includes a fixed spool or hub 26, a pair of intermeshing sliding wedge blocks 28 and 30, a doughnut spring 32 disposed between the wedge blocks 28 and 30, and a disc blade 34 disposed between the hub 26 and the wedge block 28.

Referring now to FIG. 3, the fixed hub 26 includes an enlarged end 36 having a raised polygonal surface 38, and an elongated section 40 having a rounded outer surface. The hub 26 has a square bore adapted to receive the arbor bolt 22. A plurality of hubs 26 are arranged on the arbor bolt 22 such that the end of the elongated section 40 contacts the flat surface of the next adjacent hub 26 or the bearing 20 (see FIG. 2). A nut (not shown) is threaded on the end of the arbor bolt 22 and fixes the hubs 26 on arbor bolt 22 such that the hubs 26 rotate therewith and are axially and radially fixed with respect thereto.

The disc blade 34 has a polygonal central opening larger than the rounded outer surface of the elongated section 40 and forming an inner edge 42 adapted to mate with surface 38 of hub 26. As best shown in FIG. 2, the body of the disc blade 34 extends outwardly from edge 42 forming a dish-like structure having a rounded point 44 intermediate inner edge 42 and the peripheral cutting edge 46.

The sliding wedge blocks 28 and 30 have a flange 29 and a plurality of intermeshing protrusions 45 extending to one side of flange 29 and spaced around a circular central bore adapted to receive the rounded outer surface of elongated section 40 of hub 26. Each protrusion 46 has an outer surface including a first inclined surface 48 and a second inclined surface 50 having a lesser pitch than the first surface 48.

FIG. 4 shows the yieldable disc blade assembly 24 in its normal working position. The fixed hub 26 slides over arbor bolt 22 and is axially and radially fixed with respect thereto. The inner edge 42 of disc blade 34 contacts surface 38 and rotates with hub 26. The rounded point 44 of disc blade 34 contacts the sliding wedge block 28 on the side of flange 29 opposite protrusions 46 and is biased to the working position thereby. Wedge blocks 28 and 30 are disposed in intermeshing relationship such that the doughnut spring 32 is in contact with the first surface 48 thereof, thereby biasing wedge block 28 toward disc blade 34 and holding blade 34 in its normal working position.

When the disc blade 34 encounters a rock 52, as shown in FIG. 2, and the force of doughnut spring 32 on surfaces 48 is exceeded, wedge block 28 slides axially toward wedge block 39 and doughnut spring 32 is expanded radially and forced outward to contact surfaces 50 which have a lesser pitch than surfaces 48 (see FIG. 5). Thus, the initial force required to move wedge block 28 toward wedge block 30 and trip the disc blade 34 from the normal working position is greater than the force required to continue to move wedge block 28 toward wedge block 30 once doughnut spring 32 is in contact with surfaces 50. The damage to disc blade 34 is therefore minimized by this over-center yielding action.

Thus it can be seen that a novel yieldable disc blade assembly has been provided which accomplishes at least all of its stated objectives.

Obviously, many modifications and variations of the present invention are possible in light of the above teachings. It is therefore to be understood that, within the scope of the appended claims, the invention may be practiced otherwise than as specifically described.

I claim:

1. A yieldable disc blade assembly adapted for use on a rotatably mounted shaft attached to an implement frame, said disc blade assembly comprising:
   a fixed hub attached to said shaft, said hub being axially and radially fixed with respect to said shaft;
   a disc blade having a central opening larger than said shaft, such that the disc blade is movable radially with respect to said shaft, said disc blade having one surface in contact with said fixed hub;
   means for radially positioning said disc blade with respect to said fixed hub;
   a yieldable block disposed on said shaft, said yieldable block being in contact with an opposite surface of said disc blade; and
   means for biasing said yieldable block axially in the direction of said disc blade said biasing means requiring a first greater force to move the yieldable block in a direction away from said disc blade and a second lesser force to continue movement away from said disc blade after movement progresses to a predetermined point.

2. The yieldable disc blade assembly of claim 1 wherein the means for radially positioning the disc blade to the fixed hub includes a raised polygonal surface on one side of said fixed hub and a mating polygonal central opening in said disc blade.

3. The yieldable disc blade assembly of claim 1 wherein the fixed hub is radially fixed to said shaft by a square bore of said fixed hub disposed in mating relationship with a square outer surface of said shaft.

4. The yieldable disc blade assembly of claim 1 wherein the fixed hub includes an elongated section having a rounded outer surface; and wherein the yieldable block has a rounded central bore disposed in mating relationship with the rounded outer surface of said elongated section whereby the yieldable block can rotate with respect to said fixed hub.

5. A yieldable disc blade assembly adapted for use on a rotatably mounted shaft attached to an implement frame, said disc blade assembly comprising:
   a fixed hub attached to said shaft, said hub being axially and radially fixed with respect to said shaft;
   a disc blade having a central opening larger than said shaft, said disc blade having one surface in contact with said fixed hub;
   means for radially fixing said disc blade to said fixed hub;
   a yieldable block disposed on said shaft, said yieldable block being in contact with an opposite surface of said disc blade;
   a pair of axially yieldable blocks including a flange and having a plurality of counter-opposing intermeshing protrusions extending from one side of said flange, each of said protrusions having an outer surface including a first inclined surface at the end of said protrusion and a second inclined surface intermediate said flange and said first inclined surface, said first inclined surface having a greater pitch than said second inclined surface; and
   a doughnut spring disposed intermediate said flanges and contacting the outer surfaces of said protrusions, said doughnut spring contacting the first inclined surface when said disc blade is in a normal working position and contacting the second inclined surfaces when said disc blade is in a yielding position forcing the pair of yieldable blocks toward each other.

6. The yieldable disc blade assembly of claim 5 wherein the flange of the yieldable block in contact with the opposite surface of said disc blade includes an inclined surface extending toward the disc blade, said inclined surface being disposed on the side of the flange opposite said protrusions.

* * * * *